July 31, 1945.  H. E. STRANG  2,380,802
CONTROL OF ELECTRIC SWITCHES
Filed July 14, 1943
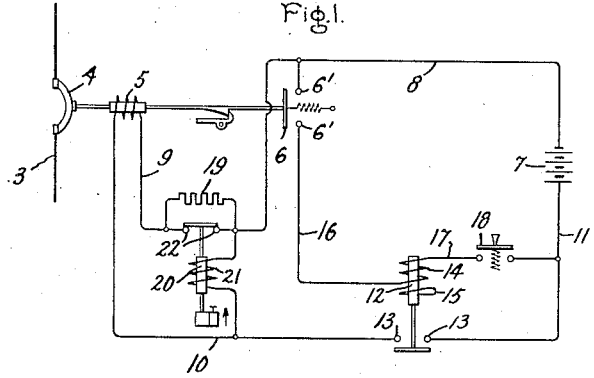
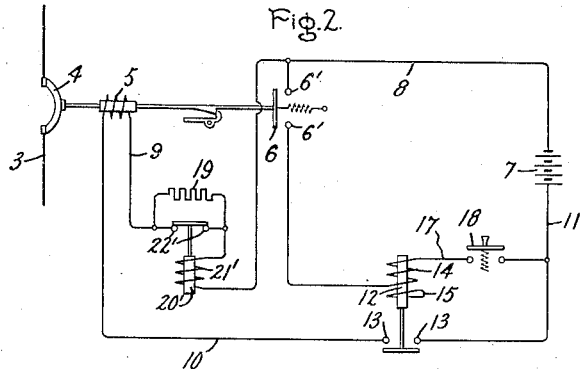
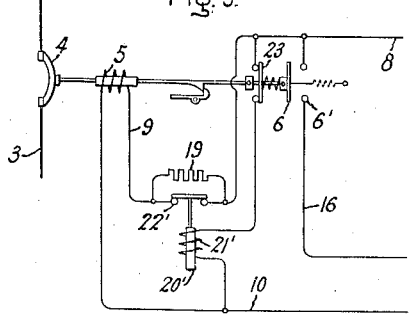
Inventor:
Harold E. Strang,
by Harry E. Dunham
His Attorney.

Patented July 31, 1945

2,380,802

UNITED STATES PATENT OFFICE 2,380,802

CONTROL OF ELECTRIC SWITCHES

Harold E. Strang, Ardmore, Pa., assignor to General Electric Company, a corporation of New York Application July 14, 1943, Serial No. 494,635

11 Claims. (Cl. 175—294)

My invention relates to improvements in the control of electric switches and more particularly to the control of the closing operation of load break switches, and particularly circuit breakers which may be closed under greater than normal load conditions and which have a control source of electromotive force whose voltage is subject to material variation.

It is usual to provide electromotive means such as solenoids, motors and the like for closing circuit breakers. Such electromotive means are energized from suitable sources of electromotive force such, for example, as control buses, storage batteries and the like. These sources often have a nominal voltage rating of 125 volts, but they are apt to vary relatively widely in voltage. Thus, for example, the voltage range may be from 90 volts to 130 volts and may even go to a lower limit of less than 90 volts. Because of this wide variation in voltage, it is not economically feasible to provide electromotive means which can effectively close the circuit breaker at voltages near the lower limit and yet do not have so much closing effort at voltages near the upper limit as to tend to damage the circuit breaker mechanism and its mounting by forces due to shocks and the like. This problem is intensified particularly when it is desired to close circuit breakers on loads exceeding normal since the magnetic repulsion action at the end of the closing operation requires more closing effort from the electromotive means. To overcome this additional opposition requires a more powerful electromotive means which must be able to function at the lower limit of the voltage range and accordingly is so much more powerful at the higher limit of the range as literally to slam the circuit breaker closed. This is likely to cause damage to the circuit breaker and any equipment subjected to the resultant shocks.

An object of my invention is to provide for an electric switch having electromotive closing means an improved closing control arrangement for positively and safely closing the switch even though the voltage of the control source varies over a relatively wide range. Another object of my invention is to provide an improved closing control arrangement for accomplishing satisfactory closing of an electric switch over an extended range in control voltage without modifying the switch structure or the electromotive means by which the switch is closed. A further object of my invention is to provide an improved closing control arrangement for closing a circuit breaker on loads in excess of normal over an extended range in control voltage without shock damage to the circuit breaker, its mounting, and associated structure. These and other objects of my invention will appear in more detail hereinafter.

In accordance with my invention, I provide means which is connected to be energized from the control circuit of the switch electromotive closing means and which is operative in dependence on the voltage of the control or energizing source for maintaining the impedance of the control circuit at a given initial value when the voltage of the control source is below a predetermined value and for increasing the impedance of the control circuit when the voltage of the control source exceeds said predetermined value. Also in accordance with my invention, the impedance change is effected by an electroresponsive control device which may be responsive to the voltage across the control circuit or the current therein during the closing operation to insert in or leave out of the control circuit the current limiting means depending on whether the voltage of the control source is high or low. Further in accordance with my invention, I arrange to have the electroresponsive control device energized only when the control circuit is closed.

My invention will be better understood from the following description when considered in connection with the accompanying drawing, and its scope will be pointed out in the appended claims.

In the accompanying drawing, Fig. 1 diagrammatically illustrates a circuit breaker closing arrangement embodying my invention, and Figs. 2 and 3 diagrammatically illustrate modifications of the embodiment of my invention shown in Fig. 1.

In the embodiment of my invention illustrated in Fig. 1, I have shown in single line diagram a circuit 3 arranged to be controlled by a latched closed circuit breaker 4 which is provided with electromotive closing means 5 and a "b" auxiliary switch 6 which is closed when the circuit breaker is open and vice versa. For controlling the energization of the closing means 5, which is illustrated simply as of the solenoid type although not so limited as far as my invention is concerned, there is provided a control source of electromotive force such as a station battery 7 and a control circuit connected thereto and comprising conductors 8, 9, 10 and 11 and including the closing winding 5. For closing this circuit, there is provided suitable means illustrated simply as a closing relay or contactor 12 having an energizing winding 14 and contacts 13 in the control circuit of the closing winding 5. As shown the relay 12 is substantially instantaneously closing. Also it is time delay opening to insure latching of the circuit breaker mechanism before opening the circuit of the closing winding 5. For this purpose, the relay 12, when used with a D.-C. source, may comprise a short circuited winding 15 to delay drop-out. For controlling the energization of the closing relay 12, its winding 14 may be connected in a circuit including the conductor 8, the circuit breaker auxiliary switch contacts 6', a conductor 16, the winding 14 of the closing relay 12, a conductor 17, a control switch 18 either manually or otherwise operated, and the conductor 11. With this arrangement, the interruption of the circuit of the winding 14 is effected at the circuit breaker auxiliary switch contacts instead of by the control switch.

In order to provide the necessary closing effort regardless of the voltage of the source 7, at least within predetermined relatively wide limits, for example, 90 volts to 130 volts on the basis of 125 volts normal, without undue shock to the circuit breaker mechanism and associated apparatus, I provide means for so varying the impedance of the control circuit in dependence on the voltage of the source that sufficient current is supplied to the closing means 5 when the voltage of the source is low and not enough to slam the breaker mechanism materially when the voltage of the source is high. As shown in Fig. 1, this impedance varying means comprises a current limiting device such as a resistance 19 and an electroresponsive device such as a circuit opening relay 20 whose winding 21 is connected across the energizing circuit so as to be energized in accordance with the voltage of the source 7 and preferably only when the energizing circuit is completed. In other words, the winding 21 of the relay 20 is connected to the conductor 8 on the source side of the resistance 19 and to the conductor 10 on the closing means side of the closing relay 12. The contacts 22 of the voltage responsive relay 20 are connected in parallel with the resistance 19, and the relay is set to maintain its contacts 22 closed unless the voltage across the control circuit exceeds a predetermined value and then to open its contacts and thus insert the resistance 19 in series with the control circuit whereby to reduce the current flow to the electromotive closing means 5 until such time as the voltage across the control circuit falls below a smaller predetermined value. The value of the resistance 19 will, of course, depend on the resistance of the control circuit and how much of the voltage of the source 7 is to be consumed in order not to overenergize the solenoid 5 at the higher voltages of the source and yet provide sufficient closing effort at the lower voltages. The value of the resistance 19 also depends on the permissible and probable voltage limits of the source 7. With the arrangement as shown, it will be apparent that since the relay device 20 is normally deenergized and the resistance 19 short circuited, the whole voltage of the source 7 is always initially applied to the control circuit and the electromotive means 5. Consequently, the flux build-up of this coil is accelerated during this initial period and this effect is retained even though the voltage of the source is so high as to cause the subsequent insertion of the resistance 19. This accelerated build-up tends to give faster closing operation.

As shown in Fig. 1, the parts are in the positions occupied under normal operating conditions. Assuming now the the circuit breaker 4 is opened by any fault responsive means or otherwise, examples of which are well known to the art, then the circuit breaker auxiliary switch 6 closes the contacts 6, 6'. To close the circuit breaker, the control switch 18 is closed, thus completing the circuit of the closing relay 12. This circuit includes the conductor 8, the auxiliary switch contacts 6, 6', the conductor 16, the winding 14 of the closing relay 12, the conductor 17, the control switch 18, the conductor 11, and the source 7. Upon closure of the contacts 13 of the closing relay 12, the energizing circuit of the electromotive means 5 is completed. Initially, at least, this circuit includes the conductor 8, the resistance 19, and the relay contacts 22 in parallel, the conductor 9, the closing means 5, the conductor 10, the closing relay contacts 13, the conductor 11, and the source 7. Since the resistance 19 is initially short circuited by the contacts 22 of the relay 20, the maximum current output for the existing voltage of the source 7 is supplied to the electromotive means 5 to expedite the build-up of flux in this mechanism. To maintain this expedited action for the optimum time, the pick-up operation of the relay 20 can be suitably delayed, as indicated in Fig. 1 of the drawing. The relay 20 will operate to open its contacts 22 if the voltage of the source 7 equals or exceeds the setting of this relay, which will operate to open its contacts 22 and insert the resistance 19, thus limiting the amount of current supplied to the closing means 5 so as to avoid overenergization of this means. The circuit breaker 4 will accordingly be closed without material shock. On the other hand, if the voltage of the source 7 is below the pick-up setting of the relay 20, the contacts of this relay 22 remain closed to keep the resistance short circuited so that sufficient current can still flow to the closing means to insure the correct closing operation thereof. As the circuit breaker mechanism moves to the closed position, the circuit breaker auxiliary switch 6 is opened to break the circuit of the closing relay 12, which drops out with a time delay sufficient to insure the completion of the operation of the latching mechanism. The opening of the contacts of this relay deenergizes the circuit of the closing means 5 and also disconnects the relay 20 from the source 7. Accordingly, this relay, if picked up, will drop out to close its contacts 22 and be ready for the next operation.

In the embodiment of my invention shown in Fig. 2 the electroresponsive means for controlling the circuit of the resistance 19 in dependence on the voltage of the source 7 is shown as a relay device 20' whose winding 21' is connected in series with the control circuit of the closing means 5 and whose circuit opening contacts 22' are connected in parallel with the resistance 19. The relay 20' is set to pick-up and open its contacts 22' and thereby insert the resistance 19 in series with the closing means 5 when the flow of current in the control circuit of this closing means exceeds an amount which would produce such overenergization of the closing means as to cause injurious shock or slam to the breaker mechanism and associated parts. Thus, when the voltage of the source 7 is high enough to cause a flow of current equal to or in excess of the pick-up setting of the relay 20', this relay will open its contacts 22' and insert the resistance 19 to limit the current in the control circuit to a safe operating value. If, on the other hand, the voltage of the source 7 is so low that the current in the control circuit remains below the pick-up setting of the relay 20', the resistance 19 continues short circuited and sufficient current flows to insure the desired closing operation of the circuit breaker.

In some circuit breaker solenoid actuated mechanisms, it is desirable to have the resistance inserting function occur just after the circuit breaker mechanism starts to move to the closed position. One way of accomplishing this, in accordance with the embodiment of my invention illustrated in Fig. 3, is to have an early closing "a" auxiliary switch 23 which, as shown in this figure, is connected in series with the winding 21' of the relay 20' so that regardless of the voltage available from the source 7 the resistance 19 is not inserted until a predetermined movement of the closing mechanism in the circuit breaker closing direction has occurred.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In an arrangement for closing a circuit breaker by electromotive means arranged to be energized from a source of electromotive force the voltage of which is subject to material variation, means for controlling the magnitude of current flow in the circuit of the electromotive means including current limiting means adapted to be connected in the circuit and means adapted to be energized from the circuit so as to operate in dependence on the voltage of the source for controlling the limiting effect of said current limiting means.

2. In an arrangement for closing a circuit breaker by electromotive means arranged to be energized from a source of electromotive force the voltage of which is subject to material variation, means for controlling the magnitude of current flow in the circuit of the electromotive means including a resistance adapted to be connected in the circuit and relay means adapted to be energized in accordance with the voltage of the source constructed and arranged when the voltage thereof is below a predetermined value to short circuit said resistance and when the voltage is above said value to open said short circuit.

3. In an arrangement for closing a circuit breaker by electromotive means arranged to be energized from a source of electromotive force the voltage of which is subject to material variation, means for controlling the magnitude of current flow in the circuit of the electromotive means including a resistance adapted to be connected in the circuit and relay means adapted to be energized in accordance with the current in the circuit constructed and arranged when the current therein is less than a predetermined value to short circuit said resistance and when the current is above said value to open said short circuit and maintain it open until the curent falls below a different predetermined value.

4. In an arrangement for closing a circuit breaker by electromotive means arranged to be energized from a source of electromotive force the voltage of which is subject to material variation, switching means adapted to be operated to complete the circuit of the electromotive means, means for controlling the magnitude of current flow in the circuit including current limiting means adapted to be connected in the circuit, and means adapted to be energized from the circuit upon closure of said switching means so as to operate in dependence on the voltage of the source for eliminating the limiting effect of said current limiting means.

5. In an arrangement for closing a circuit breaker by electromotive means arranged to be energized from a source of electromotive force the voltage of which is subject to material variation, switching means adapted to be operated to complete the circuit of the electromotive means, an impedance device adapted to be connected in the circuit, and relay means adapted to be energized in accordance with the voltage of the circuit upon closure of said switching means constructed and arranged when the voltage of the circuit is below a predetermined value to short circuit said device and when the voltage of the circuit exceeds said value to open said short circuit and maintain it open until the voltage falls below a different predetermined value.

6. In an arrangement for closing a circuit breaker by electromotive means arranged to be energized from a source of electromotive force the voltage of which is subject to material variation, means for controlling the magnitude of current flow in the circuit of the electromotive means including a resistance adapted to be connected in the circuit of the electromotive means, switching means adapted to be operated to complete the circuit, a circuit opening relay device adapted to be connected across the circuit with its contacts in parallel with said resistance operative when said switching means is closed while the voltage of the source exceeds a predetermined value to open its contacts and maintain them open as long as the voltage of the source exceds a smaller predetermined value.

7. In an arrangement for closing a circuit breaker by electromotive means arranged to be energized from a source of electromotive force the voltage of which is subject to material variation, means for controlling the magnitude of current flow in the circuit of the electromotive means including a resistance adapted to be connected in the circuit of the electromotive means, switching means adapted to be operated to complete the circuit, a circuit opening relay adapted to be energized in accordance with the current in the circuit when said switching means is closed, said relay having its contacts in parallel with said resistance and being constructed and arranged when the current in the circuit exceeds a predetermined value to open its contacts and maintain them open as long as the current exceeds a smaller predetermined value.

8. In an arrangement for closing a circuit breaker by electromotive means arranged to be energized from a source of electromotive force the voltage of which is subject to material variation, means adapted to be connected to be energized from the circuit of the electromotive means so as to operate in dependence on the voltage of the source for increasing the impedance of the circuit from a given initial value when the voltage of the source exceeds a predetermined value and for restoring the initial impedance value when the voltage of the source falls below a different predetermined value.

9. In an arrangement for closing a circuit breaker by electromotive means arranged to be energized from a source of electromotive force the voltage of which is subject to material variation, means adapted to be connected to be energized from the circuit of the electromotive means so as to operate in dependence on the voltage of the source for maintaining the impedance of the circuit at a given initial value when the voltage of the source is below a predetermined value and for increasing the impedance of the circuit when the voltage of the source exceeds said predetermined value.

10. In an arrangement for closing a circuit breaker by electromotive means arranged to be energized from a source of electromotive force, means adapted to be connected to operate in response to an electric quantity of the circuit of the electromotive means for increasing the impedance of the circuit from a given initial value at a time after said current has exceeded a predetermined value and before the circuit breaker contacts close.

11. In an arrangement for closing a circuit breaker by electromotive means arranged to be energized from a source of electromotive force, means adapted to be connected to operate in dependence on the current in the winding of the electromotive means for increasing the impedance of the circuit of the electromotive means from a given initial value at a time after said current has exceeded a predetermined value and before the circuit breaker contacts close.

HAROLD E. STRANG.